United States Patent
Cyphers

(10) Patent No.: US 7,647,588 B2
(45) Date of Patent: Jan. 12, 2010

(54) SMART ARCHIVE FOR JAR FILES

(75) Inventor: Cliff Daniel Cyphers, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 10/824,809

(22) Filed: Apr. 15, 2004

(65) Prior Publication Data

US 2005/0234987 A1 Oct. 20, 2005

(51) Int. Cl.
*G06F 9/445* (2006.01)
(52) U.S. Cl. .................. 717/176; 717/169; 717/170; 717/174; 717/175; 707/101; 707/204
(58) Field of Classification Search .............. 707/3, 707/101, 204; 717/168–178
See application file for complete search history.

(56) References Cited

U.S. PATENT DOCUMENTS

| | | | | |
|---|---|---|---|---|
| 6,026,437 | A | 2/2000 | Muschett et al. | 709/219 |
| 6,286,051 | B1* | 9/2001 | Becker et al. | 709/236 |
| 6,289,512 | B1 | 9/2001 | Edwards et al. | 717/11 |
| 6,405,265 | B1* | 6/2002 | Kronenberg et al. | 719/321 |
| 6,427,149 | B1* | 7/2002 | Rodriguez et al. | 707/10 |
| 6,535,894 | B1* | 3/2003 | Schmidt et al. | 707/204 |
| 6,546,554 | B1 | 4/2003 | Schmidt et al. | 717/176 |
| 6,560,618 | B1 | 5/2003 | Ims | 707/204 |
| 6,633,892 | B1* | 10/2003 | Chan et al. | 707/204 |
| 6,637,025 | B1 | 10/2003 | Beadle et al. | 717/148 |
| 6,879,988 | B2* | 4/2005 | Basin et al. | 707/200 |
| 6,920,630 | B2* | 7/2005 | Jackson | 717/168 |
| 7,069,553 | B2* | 6/2006 | Narayanaswamy et al. | 717/173 |
| 2002/0104071 | A1* | 8/2002 | Charisius et al. | 717/109 |
| 2002/0129053 | A1* | 9/2002 | Chan et al. | 707/503 |

OTHER PUBLICATIONS

Funduc, "Search and Replace for Windows", Apr. 12, 2003, retrieved from: http://web.archive.org/web/20030412174159/http://funduc.com/search_replace.htm.*

Alan Sommerer, "The Java Archive (JAR) File Format", Sep. 1998, retrieved from: http://java.sun.com/developer/Books/javaprogramming/JAR/index.html.*

* cited by examiner

*Primary Examiner*—Lewis A Bullock, Jr.
*Assistant Examiner*—Jue S Wang
(74) *Attorney, Agent, or Firm*—Yee & Associates, P.C.; William H. Steinberg; Rudolf O. Siegesmund

(57) ABSTRACT

A method for updating values within the contents of a JAVA Archive (JAR) file without altering the JAR file structure. The present invention comprises a Smart Archive Program (SAP) and a Graphical User Interface (GUI) for implementing the SAP. The SAP creates a temporary directory in a computer's memory and stores the JAR file structure in the memory. The SAP then extracts the JAR file content into the temporary directory and allows the user to update the field values within the JAR file content. When the user has finished updating the field values in the JAR file content, the SAP archives the JAR file content into a new JAR file according to the JAR file structure stored in memory. Consequently, the present invention is able to update the field values within the JAR file content without altering the JAR file structure.

3 Claims, 2 Drawing Sheets

SMART ARCHIVE FOR JAR FILES

FIELD OF THE INVENTION

The present invention is directed at a method for preserving the file order within the structure of a JAVA Archive (JAR) file after the individual files within the JAR file have been updated.

BACKGROUND OF THE INVENTION

Computer programmers have developed several different file compression formats for specific uses between computers. One of the file compression formats is a JAVA Archive (JAR) file. A JAR file is a single file that contains the class(es), images, sound files, and any other data files needed by a JAVA application. JAR files are typically processed by a JAVA Virtual Machine (JVM). A user does not need to open or view a JAR file directly. Instead, the JAR file is opened automatically by the JVM when the requested application is initiated. Thus, the user may be unaware of the JAR file's existence.

One of the limitations of certain applications using JAR files is that the applications store configuration information in the files within a JAR file. Storing the configuration information in the files within the JAR file is limiting because the order in which the individual files are archived affects how the application accesses the configuration information. If the structure of the JAR file is modified during an update to the configuration information, then the application cannot access the configuration information. Consequently, when a user unarchives a JAR file, updates the content of individual files, and then re-archives the JAR file, the resulting new JAR file may not have the same structure as the original JAR file.

Some computer applications, such as WebSphere Business Integration Server (WBI), require all of the JAR files to have the same structure. Typically, these computer applications do not use a configuration file for certain processes and must be configured through the JAR files. These types of computer applications will not run correctly if the structure of one of the JAR files is different from the structure of the other JAR files. Because the JAR files must be frequently updated, a need exists for a method of updating the contents of one of the JAR files while keeping the structure of all of the JAR files uniform.

When working with computer applications that require all of the JAR files to have the same structure, the prior art solution has been to create a completely new set of JAR files anytime the JAR files need to be updated. The prior art solution is advantageous because the JAR file structure is uniform for every JAR file. However, building new JAR files is time consuming, must be completed manually, and is error prone. A better solution would allow the user to update the JAR files that need to be updated without changing the JAR file structure. If the JAR file structure does not change during the update process, then there is no need to create a new set of JAR files. Consequently, a need exists in the art for a method for automatically updating a JAR file such that the JAR file structure remains unchanged.

SUMMARY OF THE INVENTION

The present invention is a method for updating values within the contents of a Java Archive (JAR) file without altering the JAR file structure. The software embodiment of the present invention comprises a Smart Archive Program (SAP) and a Graphical User Interface (GUI) for implementing the SAP. The SAP creates a temporary directory in a computer's memory and stores the JAR file structure in the memory. The SAP then extracts the JAR file content into the temporary directory and allows the user to update the field values within the JAR file content. When the user has finished updating the field values in the JAR file content, the SAP archives the JAR file content into a new JAR file according to the JAR file structure stored in memory. Consequently, the present invention is able to update the field values within the JAR file content without altering the JAR file structure.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "archive" shall mean to compress the JAR file content into a JAR file such that the JAR file is smaller than the original JAR file content.

As used herein, the term "computer" shall mean a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, the term "extract" shall mean shall mean to decompress the JAR file content from a JAR file.

As used herein, the term "field" shall mean a data position within one of the JAR file content that stores a value.

As used herein, the term "JAR file" shall mean an archived form of the JAR file content that is smaller than the JAR file content.

As used herein, the term "JAR file content" shall mean one or more computer files located in a JAR file that store data in fields.

As used herein, the term "JAR file structure" shall mean the order and arrangement of the compressed JAR file content within the JAR file.

As used herein, the term "new value" shall mean the updated data value within a field of one of the JAR file content.

As used herein, the term "old value" shall mean a data value within a field of one of the JAR file content that needs to be updated.

Figure 1:
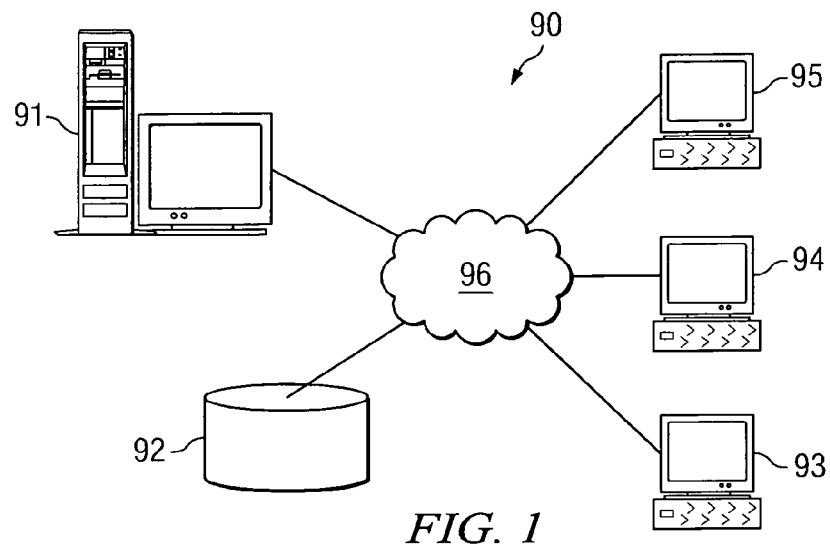
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
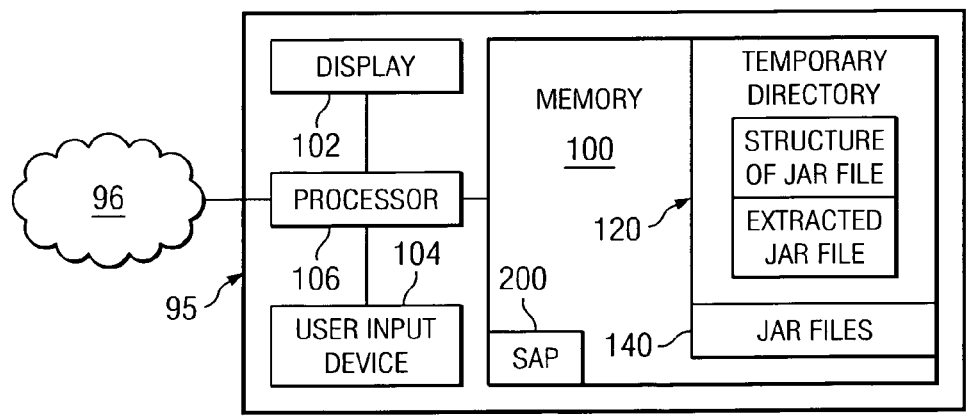
FIG. 2 is an illustration of a computer, including a memory and a processor, associated with the present invention.

The internal configuration of a computer, including connection and orientation of the processor, memory, and input/output devices, is well known in the art. The present invention may be a method, a stand alone computer program, or a plug-in to an existing computer program. Persons of ordinary skill in the art are aware of how to configure computer programs, such as those described herein, to plug into an existing computer program. Referring to FIG. 2, the methodology of the present invention is implemented on software by Smart Archive Program (SAP) 200. SAP 200 described herein can be stored within the memory of any computer depicted in FIG. 1. Alternatively, SAP 200 can be stored in an external storage device such as a removable disk, a CD-ROM, or a USB storage device. Memory 100 is illustrative of the memory within one of the computers of FIG. 1. Memory 100 also contains temporary directory 120 and JAR files 140.

Temporary directory 120 is a computer file, folder, or directory that is used for updating JAR files 140. Temporary directory 120 contains a computer file that records the JAR file structure 140 that is being updated. Temporary directory 120 also contains the extracted JAR file 140 being updated. JAR files 140 are compressed files that are transmitted between computers. The present invention may interface with temporary directory 120 and/or JAR files 140 through memory 100.

As part of the present invention, the memory 100 can be configured with SAP 200, temporary directory 120, and/or JAR files 140. Processor 106 can execute the instructions contained in SAP 200. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 96.

In alternative embodiments, SAP 200, temporary directory 120, and/or JAR files 140 can be stored in the memory of other computers. Storing SAP 200, temporary directory 120, and/or JAR files 140 in the memory of other computers allows the processor workload to be distributed across a plurality of processors instead of a single processor. Further configurations of SAP 200, temporary directory 120, and/or JAR files 140 across various memories, such as client memory and server memory, are known by persons of ordinary skill in the art.

Figure 3:
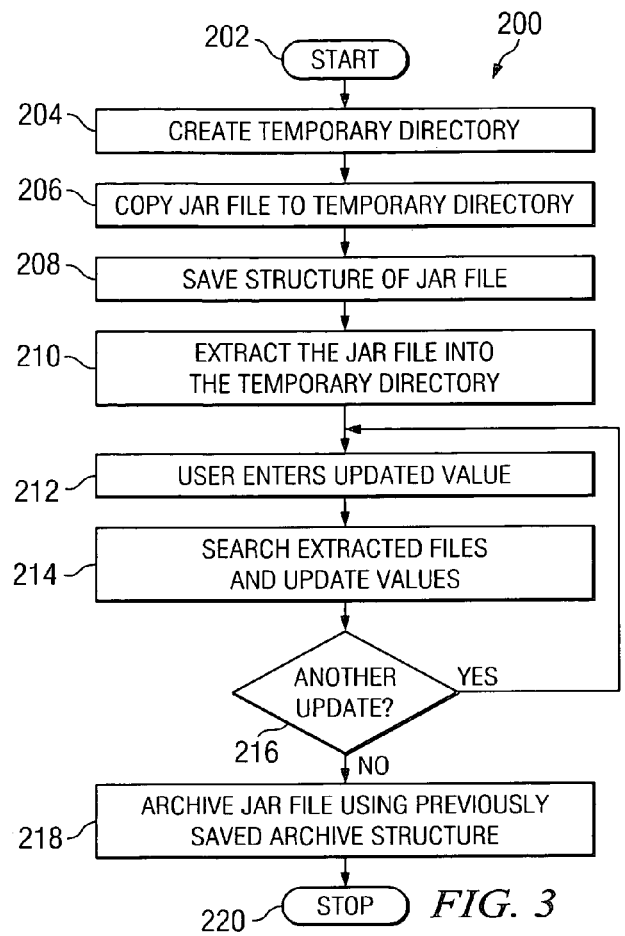
FIG. 3 is an illustration of the logic of the Smart Archive Program (SAP) of the present invention.

FIG. 3 is an illustration of the logic of Smart Archive Program (SAP) 200 of the present invention. SAP 200 is a computer program that retains the original structure of a JAR file when updating the JAR file. The JAR file may be like JAR file 140 depicted in FIG. 2. SAP 200 starts (202) whenever the user needs to update a JAR file. SAP 200 then creates the temporary directory (tmp) (204). The temporary directory may be like temporary directory 120 in FIG. 2. If the temporary directory is already created, SAP 200 can optionally clean out the temporary directory or create a new temporary directory. SAP 200 then copies the JAR file to the temporary directory (206). SAP 200 then records the JAR file structure in a structure file in the temporary directory (208). The JAR file structure can be saved by executing the code: jar_contents='jar-tvfM $jar_file|awk '{printf $8""}''. SAP 200 then extracts the JAR file into the temporary directory (210). The JAR file can be extracted by executing the code: jar-xMvf $jar_file. SAP 200 then accepts a user input of an update to the JAR file (212). The update comprises a file to search, a field to search within the file, an old value to search for within the field, and a new value to replace the old value. SAP 200 searches the designated file and field for the old value and replaces each occurrence of the old value with a new value (214). The Jar file can be searched and updated by executing the code: sed -e "s/@<Search String>@<Replace String@g"<$file>tmp_file ; mv tmp_file $file. SAP 200 then determines if the user wants to update another value in the JAR file (216). If the user wants to update another value in the JAR file, then SAP 200 returns to step 212. If the user does not want to update another value in the JAR file, then SAP 200 archives the JAR file according to the structure file in the temporary directory (218). In other words, SAP 200 looks to the structure file to determine the specific structure in which the JAR file should be compressed. The JAR file may be correctly archived by executing the code: jar -cMvf $jar_file $jar_contents. SAP 200 then ends (220). The code shown above is one embodiment of code that can be used to implement the present invention. Persons of ordinary skill in the art are aware of other methods for implementing the method of the present invention.

Figure 4:
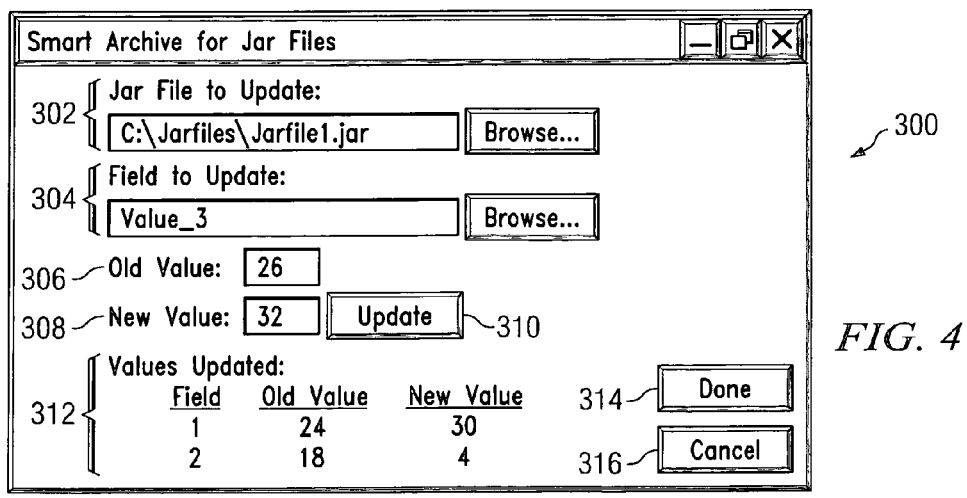
FIG. 4 is an illustration of the Graphical User Interface (GUI) of the present invention.

FIG. 4 is an illustration of the Graphical User Interface (GUI) 300 associated with the present invention. GUI 300 is an example of an interface that a user would use to update JAR files 140 using SAP 200. GUI 300 contains a JAR file to update section 302 that allows the user to either enter the JAR file name directly or select the JAR file using the browse button. GUI 300 also contains a field to update section 304 that allows the user to either enter the JAR file field name directly or select the JAR file field using the browse button. GUI 300 also contains old value section 306 and new value section 308. The user enters the old value in old value section 306 and the new value in new value section 308. The old value is the value for the field in the JAR file that SAP 200 searches for in step 214. The new value is the value that replaces the old value in the field. The user may initiate the search and replace action using update button 310. GUI 300 records the values that have been updated in values updated section 312. The user may accept the updates to the fields using done button 314 or may cancel the updates to the fields using cancel button 316.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A computer implemented method for updating an original plurality of files within an original archive file without altering an order and an arrangement of the original archive file, comprising:

using a computer having a processor and a memory connected to the processor, storing a program in the memory of the computer, the program adapted to cause the processor to perform steps comprising:

creating a temporary directory;

copying the original archive file into the temporary directory;

recording an order and an arrangement of the original archive file in a structure file in the temporary directory;

decompressing the plurality of original files within the original archive file to the temporary directory;

creating an updated plurality of files, wherein the updated plurality of files includes a plurality of edits to the plurality of original files to create the updated plurality of files, wherein the updated plurality of files have a different order and a different arrangement than the plurality of original files; and compressing the updated plurality of files into a new archive file according to the order and the arrangement stored in the structure file, wherein the new archive files's order and arrangement is the same as the original archive files's order and arrangement.

2. An apparatus for updating an original plurality of files within an original archive file without altering an order and an arrangement of the original archive file, comprising:

a computer having a processor and a memory connected to the processor;

a program stored in the memory of the computer, the program adapted to cause the processor to create a temporary directory, copy the original archive file into the temporary directory, record an order and an arrangement of the original archive file in a structure file in the temporary directory, decompress the plurality of original files within the original archive file to the temporary directory, create an updated plurality of files, wherein the updated plurality of files includes a plurality of edits to the plurality of original files to create the updated plurality of files, wherein the updated plurality of files have a different order and a different arrangement than the plurality of original files, and compressing the updated plurality of files into a new archive file according to the order and the arrangement stored in the structure file, wherein the new archive files's order and arrangement is the same as the original archive files's order and arrangement.

3. computer program product for updating an original plurality of files within an original archive file without altering an order and an arrangement of the original archive file, comprising:

a computer-readable storage medium;

a program stored in the computer-readable storage medium, the program adapted to cause a processor of a computer to create a temporary directory, copy the original archive file into the temporary directory, record an order and an arrangement of the original archive file in a structure file in the temporary directory, decompress the plurality of original files within the original archive file to the temporary directory, create an updated plurality of files, wherein the updated plurality of files includes a plurality of edits to the plurality of original files to create the updated plurality of files, wherein the updated plurality of files have a different order and a different arrangement than the plurality of original files, and compressing the updated plurality of files into a new archive file according to the order and the arrangement stored in the structure file, wherein the new archive files's order and arrangement is the same as the original archive files's order and arrangement.

* * * * *

UNITED STATES PATENT AND TRADEMARK OFFICE
CERTIFICATE OF CORRECTION

PATENT NO. : 7,647,588 B2
APPLICATION NO. : 10/824809
DATED : January 12, 2010
INVENTOR(S) : Cliff Daniel Cyphers It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this

Sixteenth Day of November, 2010

David J. Kappos
*Director of the United States Patent and Trademark Office*